United States Patent
Yucek et al.

(10) Patent No.: US 9,386,584 B2
(45) Date of Patent: Jul. 5, 2016

(54) INTER-FRAME SPACING DURATION FOR SUB-1 GIGAHERTZ WIRELESS NETWORKS

(71) Applicant: QUALCOMM Incorporated, San Diego, CA (US)

(72) Inventors: Tevfik Yucek, Santa Clara, CA (US); Simone Merlin, San Diego, CA (US); Hemanth Sampath, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 13/901,193

(22) Filed: May 23, 2013

(65) Prior Publication Data
US 2013/0329702 A1    Dec. 12, 2013

Related U.S. Application Data

(60) Provisional application No. 61/677,336, filed on Jul. 30, 2012, provisional application No. 61/669,489, filed on Jul. 9, 2012, provisional application No. 61/658,341, filed on Jun. 11, 2012.

(51) Int. Cl.
*H04L 12/413* (2006.01)
*H04W 72/04* (2009.01)
*H04W 74/08* (2009.01)

(52) U.S. Cl.
CPC ........ *H04W 72/046* (2013.01); *H04W 74/0808* (2013.01)

(58) Field of Classification Search
None
See application file for complete search history.

(56) References Cited

U.S. PATENT DOCUMENTS

| 7,349,422 | B2 | 3/2008 | Duong et al. |
| 8,194,626 | B2 | 6/2012 | Moorti et al. |
| 2002/0172186 | A1* | 11/2002 | Larsson ........................ 370/349 |
| 2006/0215686 | A1* | 9/2006 | Takeuchi ....................... 370/445 |
| 2007/0115877 | A1* | 5/2007 | Zhen ..................... H04W 72/10 370/329 |
| 2007/0153830 | A1 | 7/2007 | Xhafa et al. |
| 2008/0009306 | A1* | 1/2008 | Suga et al. ..................... 455/522 |
| 2008/0317062 | A1* | 12/2008 | Timmers et al. .............. 370/462 |
| 2010/0135178 | A1* | 6/2010 | Aggarwal et al. ............. 370/252 |
| 2010/0166010 | A1* | 7/2010 | Ukita et al. .................... 370/465 |
| 2010/0296403 | A1* | 11/2010 | Qiu et al. ....................... 370/252 |
| 2011/0176468 | A1* | 7/2011 | Sridhara et al. ............... 370/311 |
| 2012/0195391 | A1 | 8/2012 | Zhang et al. |
| 2012/0263156 | A1* | 10/2012 | Abraham et al. ............. 370/338 |

(Continued)

OTHER PUBLICATIONS

International Search Report and Written Opinion for PCT/US2013/042615 mailed Aug. 8, 2013, International Searching Authority, European Patent Office, 12 pages.

(Continued)

*Primary Examiner* — Anh-Vu Ly
(74) *Attorney, Agent, or Firm* — Toler Law Group, PC

(57) ABSTRACT

Systems and methods of performing communication via a sub-1 gigahertz wireless network are disclosed. Values of one or more inter-frame spacing parameters for use in communication via the sub-1 gigahertz wireless network are also defined. The parameters may include a short inter-frame spacing (SIFS) time of 160 microseconds (μs). The parameters may also include a clear channel assessment (CCA) time of 40 μs. Additional parameters, such as air propagation time are also defined (e.g., for inclusion into a standard, such as Institute of Electrical and Electronics Engineers (IEEE) 802.11ah).

19 Claims, 4 Drawing Sheets

(56) References Cited

U.S. PATENT DOCUMENTS

2013/0223306 A1* 8/2013 Jin et al. .................. 370/311
2013/0301551 A1* 11/2013 Ghosh et al. ............. 370/329

OTHER PUBLICATIONS

Koskela, T. et al., "On the 802.11ah Performance", doc.: IEEE 802.11-12/0362r0, IEEE, Piscataway, NJ, USA, Mar. 7, 2012, pp. 1-10.

Park, Minyoung, "IEEE P802.11 Wireless LANs—Specification Framework for TGah", IEEE 802.11-11/1137r14, Mar. 2013, 67 pp.

Yucek, Tevfik, et al., "11ah Interframe Spacing Values", IEEE 802.11-12/1104r2—Sep. 17, 2012, 17 pp.

Shao, Huai-Rong, et al., "802.11ah Channelization Proposal for US", IEEE 802.11-11/1516r0, Nov. 7, 2011, 7 pp.

Hedayat, Reza, et al., "D0.1 Comment Resolution—CIDs on CCA", IEEE 802.11-11/0372r11, Mar. 2011, 7 pp.

Stacey, Robert, et al., "IEEE P802.11 Wireless LANs—Specification Framework for TGac", IEEE 802.11-09/0992r18, Sep. 2010, 44 pp.

* cited by examiner

INTER-FRAME SPACING DURATION FOR SUB-1 GIGAHERTZ WIRELESS NETWORKS

I. CLAIM OF PRIORITY

This application claims priority from U.S. Provisional Patent Application No. 61/658,341, filed Jun. 11, 2012, entitled "INTERFRAME SPACING DURATION FOR IEEE 802.11AH," U.S. Provisional Patent Application No. 61/669,489, filed Jul. 9, 2012, entitled "INTERFRAME SPACING DURATION FOR IEEE 802.11AH," and U.S. Provisional Patent Application No. 61/677,336, filed Jul. 30, 2012, entitled "INTERFRAME SPACING DURATION FOR IEEE 802.11AH," the contents of each of which are incorporated by reference in their entirety.

II. FIELD OF THE DISCLOSURE

The present disclosure is generally directed to inter-frame spacing duration for sub-1 gigahertz wireless networks.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless computing devices include other types of devices that are incorporated therein. For example, wireless computing devices can also include a digital still camera, a digital video camera, a digital recorder, and an audio file player. Also, such wireless computing devices include a processor that can process executable instructions, including software applications, such as a web browser application, that can be used to access the Internet. As such, these wireless computing devices can include significant computing capabilities. As use of wireless computing devices increases, bandwidth allocated to wireless communication may become congested with increased traffic. To alleviate such congestion, one possible approach is to allocate bandwidth to wireless computing devices that was previously underutilized.

As demand for wireless data communications has increased, communication systems may be designed to operate in the underutilized sub-1 GHz (gigahertz) spectrum in the Industrial, Scientific, and Medical (ISM) band. In addition to use of the underutilized sub-1 GHz spectrum, improved coverage range of the communication systems may allow new applications to emerge, such as wide area based sensor networks, sensor backhaul systems, and wireless fidelity (Wi-Fi) off-loading functions.

IV. SUMMARY

The Institute of Electrical and Electronics Engineers (IEEE) has promulgated various industry specifications related to wireless networking, many of which are designated with the "IEEE 802.11" name. For example, 802.11b (entitled "Higher Speed Physical Layer Extension in the 2.4 GHz Band" and referred to as Clause 18) is a wireless networking standard that may be used in customer premise wireless networking, such as in a home or office environment and 802.11n (entitled "Standard for Information Technology—Local and Metropolitan Area Networks—Specific Requirements Part 11: Wireless LAN Medium Access Control (MAC) and Physical Layer (PHY) Specifications Amendment 5: Enhancements for Higher Throughput 2009") is a wireless networking standard that may be used for high speed wireless local area network (WLAN) implementations. "In progress" IEEE 802.11 standards include 802.11ac (entitled "Enhancements for Very High Throughput") and 802.11ah (entitled "Sub-1 GHz Sensor Network"). IEEE 802.11ah is a standard for using carrier frequencies below 1 GHz in the Industrial, Scientific, and Medical (ISM) band for wireless local area network (WLAN) communication. Some items not yet finalized by IEEE 802.11ah include physical layer (PHY) parameters or constraints.

The present disclosure provides one or more parameters or constraints for sub-1 GHz networks (e.g., networks that may be compatible with the IEEE 802.11ah standard) and for transmissions (e.g., transmissions that comply with the IEEE 802.11ah standard) to enable a station (e.g., a transmitter or a transmit station) to transmit a protocol data unit (PPDU). The one or more parameters or constraints may be associated with or include one or more inter-frame spacing (timing) parameters. In particular embodiments, the selected inter-frame spacing values may be the minimum required to achieve successful operation for a carrier sense multiple access (CSMA) mechanism in IEEE 802.11ah systems.

Based on the one or more parameters or constraints, a station (e.g., a mobile communication device) may transmit a PPDU using bandwidth channels with carrier frequencies below 1 GHz in the Industrial, Scientific, and Medical (ISM) band. The PPDU may include one or more symbols and may be transmitted via a wireless local area network (WLAN). The channels may include 1 megahertz (MHz) bandwidth channels, 2 MHz bandwidth channels, 4 MHz bandwidth channels, 8 MHz bandwidth channels, 16 MHz bandwidth channels, or a combination thereof. For example, in the United States, twenty-six 1 MHz bandwidth channels, thirteen 2 MHz bandwidth channels, six 4 MHz bandwidth channels, three 8 MHz bandwidth channels, or one 16 MHz bandwidth channel of the 902 MHz-928 MHz wireless spectrum may be used. The lower half of each 2 MHz bandwidth channel may be used as a primary 1 MHz bandwidth channel and the upper half of each 2 MHz bandwidth channel may be used as a secondary 1 MHz bandwidth channel. For example, a station may use the primary bandwidth channel to transmit data having 1 MHz bandwidth and may use both the primary bandwidth channel and the secondary channel to transmit data having 2 MHz bandwidth. A station using a 1 MHz bandwidth channel may be said to be operating in a 1 MHz mode. A station using a 2 MHz bandwidth channel may be said to be operating in a 2 MHz mode.

In a particular embodiment, an apparatus includes a transmitter. The transmitter is operable to transmit a frame, via a sub-1 gigahertz (GHz) wireless network, at a start time based at least in part on a short inter-frame spacing (SIFS) time of 160 microseconds.

In another particular embodiment, a non-transitory computer-readable storage device stores instructions. The instructions, when executed by a processor, cause the processor to initiate transmission, via a sub-1 gigahertz (GHz) wireless network, of a frame at a start time based on a short inter-frame spacing (SIFS) time. The SIFS time is 160 microseconds.

In another particular embodiment, a non-transitory computer-readable storage device stores instructions. The instructions, when executed by a processor, cause the processor to initiate transmit, via a sub-1 gigahertz (GHz) wireless network, of a frame at a start time based on a clear channel assessment (CCA) time. The CCA time is 40 microseconds.

In another particular embodiment, a method includes transmitting, from a station, a frame via a sub-1 gigahertz (GHz) wireless network. The frame is transmitted at a start time based at least in part on a clear channel assessment (CCA) time of 40 microseconds.

An advantage provided by the disclosed embodiments is one or more inter-frame spacing parameters that enable transmission and reception of data via a sub-1 GHz wireless network. The one or more inter-frame spacing parameters may be included in a standard, such as the IEEE 802.11ah standard.

Other aspects, advantages, and features of the present disclosure will become apparent after review of the application, including the following sections: Brief Description of the Drawings, Detailed Description, and the Claims.

V. BRIEF DESCRIPTION OF THE DRAWINGS

VI. DETAILED DESCRIPTION

Particular embodiments of the present disclosure are described below with reference to the drawings. In the description, common features are designated by common reference numbers throughout the drawings.

A station may transmit a data packet (e.g., including a data symbol or a PPDU) via a sub-1 GHz network. Transmission of the data packet may be based on one or more inter-frame spacing (timing) parameters. For example, the one or more parameters or constraints may be included in an Institute of Electrical and Electronics Engineers (IEEE) 802.11 ah standard.

Figure 1:
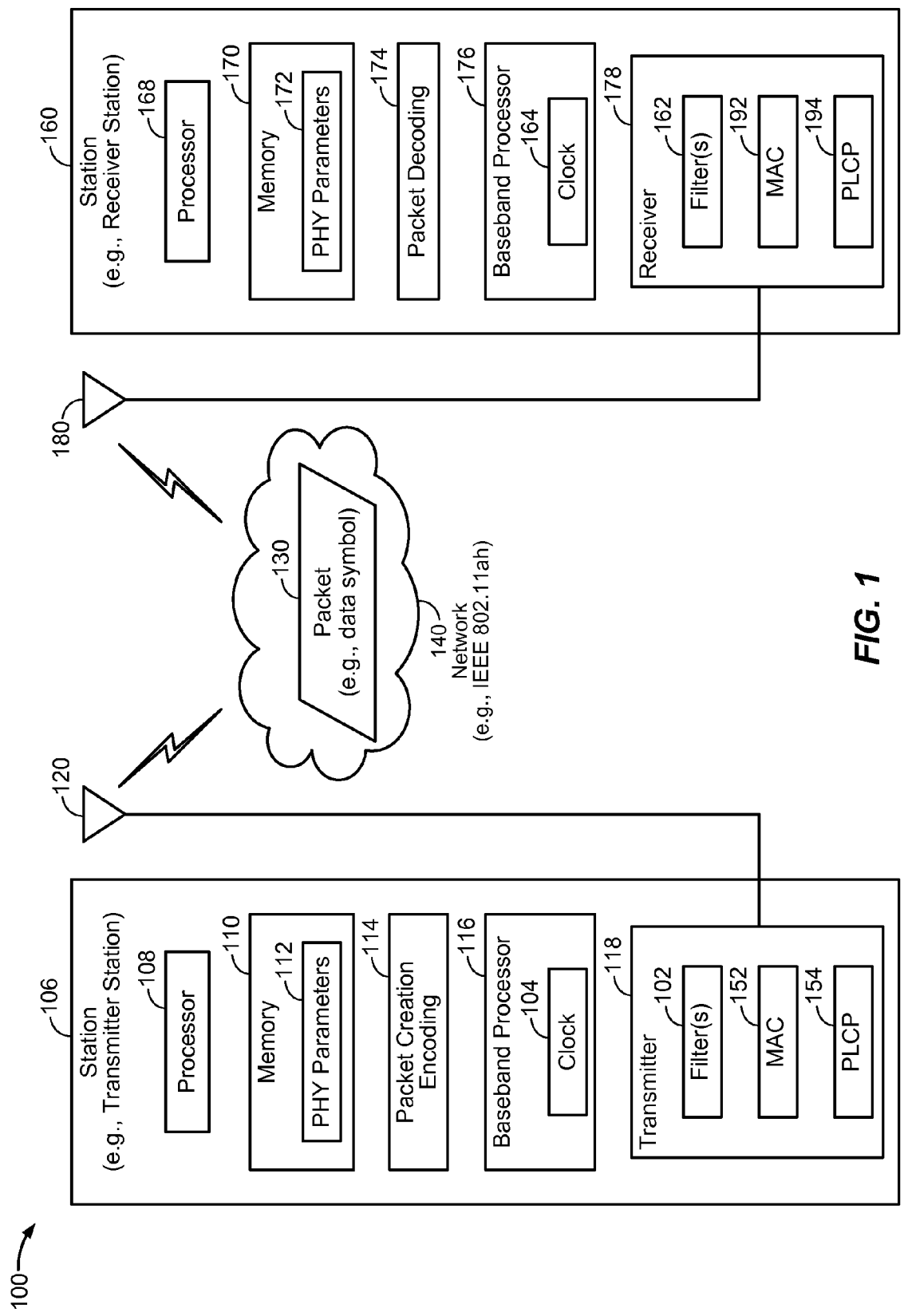
FIG. 1 is a diagram of an illustrative embodiment of a system that communicates data via a sub-1 GHz wireless network.

FIG. 1 is a diagram of a particular embodiment of a system 100 that is operable to communicate data via a wireless network 140. The system 100 includes a transmitter station 106 and a receiver station 160. The transmitter station 106 may be configured to transmit a packet 130 to the receiver station 160 via the network 140. Although a single transmitter and a single receiver are shown in FIG. 1, alternate embodiments include more than one transmitter, more than one receiver, or both. Although a dedicated transmitter station 106 and a dedicated receiver station 160 are shown in FIG. 1, some devices may be capable of both packet transmission as well as packet reception (e.g., transceivers or mobile communication devices that include a transceiver). Thus, the network 140 supports two-way communication.

The network 140 may operate in accordance with an IEEE 802.11ah protocol. The network 140 may support communication via a plurality of channels (e.g., sub-1 GHz bandwidth channels). In a particular embodiment, a bandwidth of channels of the network 140 varies from 1 MHz to 16 MHz, depending on regulatory guidelines in a geographic region where the network 140 is located. For example, a channel bandwidth may be 16 MHz in the United States, 2 MHz in Europe, and 4 MHz in another regulatory domain. When data is communicated via the network 140, operating bandwidth used for communication in each of the channels may be less than or equal to the channel bandwidth of the channel. For example, operating bandwidth within a 2 MHz channel (e.g., in the United States) may be 1.5 MHz, 1.66 MHz, 1.75 MHz, 2 MHz, or some other bandwidth less than or equal to 2 MHz.

The transmitter station 106 may include a processor 108, a memory 110, a packet creation/encoding module 114, a baseband processor 116, and a transmitter 118. The processor 108 (e.g., a digital signal processor (DSP), an application processor, etc.) may be coupled to the memory 110. In a particular embodiment, the processor 108 includes logic (e.g., hardware and/or circuit elements) to generate the packet 130 to be transmitted via the network 140. Alternatively, the packet 130 may be generated, encoded, or a combination thereof, by the packet creation/encoding module 114 (e.g., hardware, circuit elements, software, or a combination thereof).

The memory 110 may be a non-transitory computer readable storage medium that stores data, instructions, or both. The memory 110 may include PHY parameters 112 associated with the network 140 and with transmission of the packet 130. The transmitter station 106 may transmit the packet 130 (e.g., a protocol data unit (PPDU) or a data symbol) via the network 140 based on the PHY parameters 112. For example, the PHY parameters 112 may be associated with one or more inter-frame spacing (timing) parameters. In a particular embodiment, the PHY parameters 112 are stored in a table or an array in the memory 110, hardcoded in one or more circuits or components, or a combination thereof.

The memory 110 may also include instructions (not shown) that are executable by the processor 108 to cause the processor 108 to perform one or more functions or methods as further described herein. For example, the instructions may include or represent user applications, an operating system, other executable instructions, or a combination thereof. Further, the memory 110 may store the packet 130 generated by the processor 108 or generated by the packet creation/encoding module 114.

The baseband processor 116 (e.g., an IEEE 802.11ah baseband processor) may be coupled to the processor 108, the packet creation/encoding module 114, and the transmitter 118. The baseband processor 116 may include a clock 104. The transmitter 118 may include filter(s) 102 (e.g., one or more radio frequency (RF) filters), a media access control (MAC) module 152, and a physical layer convergence procedure (PLCP) module 154. The transmitter 118 may include a transceiver that enables the transmitter station 106 to wirelessly transmit data and wirelessly receive data. The transmitter 118 (e.g., a RF transmitter) may be coupled to one or more wireless antennas 120. Additionally, the transmitter station 106 may include one or more oscillators for use in generating a transmit center frequency, a symbol clock frequency, or a combination thereof, for use by the transmitter station 106. In a particular embodiment, the processor 108 may initiate sending of the packet 130 (via the baseband processor 116, the transmitter 118, and the wireless antennas 120) from the transmitter station 106 to the receiver station 160 or another device via one or more channels of the network 140. Transmission of the packet 130 via the network 140 may comply with one or more constraints included in the IEEE 802.11ah standard. For example, the transmitter station 106 may transmit the packet 130 based on inter-frame spacing parameters specified by the IEEE 802.11ah standard.

The receiver station 160 may include a station, an access point, or another device configured to receive one or more data packets (e.g., data symbols), such as the packet 130 sent via the network 140. The receiver station 160 may include a processor 168, a memory 170, a packet decoding module 174, a baseband processor 176, and a receiver 178. The processor 168 (e.g., a digital signal processor (DSP), an application processor, etc.) may be coupled to the memory 170. In a particular embodiment, the processor 168 includes logic (e.g., hardware and/or circuit elements) to process the packet 130 received at the receiver station 160 via the network 140. Alternatively, the packet 130 may be decoded (e.g., deconstructed) by the packet decoding module 174 (e.g., hardware, circuit elements, software, or a combination thereof).

The memory 170 may be a non-transitory computer readable storage medium that stores data, instructions, or both. The memory 170 may include PHY parameters 172 associated with the network 140 and reception of transmission of the packet 130. The receiver station 160 may receive the packet 130 (e.g., a protocol data unit (PPDU) or a data symbol) via the network 140 and process the received packet 130 based on the PHY parameters 172. For example, the PHY parameters 172 may be associated with one or more inter-frame spacing (timing) parameters. In a particular embodiment, the PHY parameters 172 are stored in a table or an array in the memory 170, hardcoded in one or more circuits or components, or a combination thereof.

The memory 170 may also include instructions (not shown) that are executable by the processor 168 to cause the processor 168 to perform one or more functions or methods as further described herein. For example, the instructions may include or represent user applications, an operating system, other executable instructions, or a combination thereof. Further, the memory 170 may store the packet 130 or processed data from the packet 130 generated by the processor 108 or the packet decoding module 174.

The baseband processor 176 (e.g., an IEEE 802.11ah baseband processor) may be coupled to the processor 168, the packet decoding module 174, and the receiver 178. The baseband processor 176 may include a clock 164. The receiver 178 may include filter(s) 162 (e.g., one or more RF filters), a media access control (MAC) module 192, and a physical layer convergence procedure (PLCP) module 194. The receiver 178 may include a transceiver that enables the receiver station 160 to wirelessly transmit data and wirelessly receive data. The receiver 178 (e.g., a RF receiver) may be coupled to one or more wireless antennas 180. Additionally, the receiver station 160 may include one or more oscillators for use in generating one or more clock signals or frequency signals. In a particular embodiment, the receiver station 160 may receive the packet 130 (via the wireless antennas 180, the receiver 178, and the baseband processor 176) from the transmitter station 106 or another device via one or more channels of the network 140. Transmission and reception of the packet 130 via the network 140 may comply with one or more constraints included in the IEEE 802.11ah standard.

During operation, the processor 108, the packet creation/encoding module 114, the baseband processor 116, or a combination thereof, of the transmitter station 106 may create (e.g., generate) and encode the packet 130 based on the PHY parameters 112. The packet 130 may be transmitted by the transmitter station 106 via the transmitter 118 and the one or more wireless antennas 120. The packet 130 may be transmitted to the receiver station 160 via the network 140. Transmission of the packet 130 via the network 140 may comply with one or more constraints included in the IEEE 802.11ah standard. The receiver station 160 may receive the packet 130 via the one or more wireless antennas 180 and the receiver 178. The processor 168, the packet decoding module 174, the baseband processor 176, or a combination thereof, may decode the packet 130 based on the PHY parameters 172.

The system 100 may thus provide a transmitter configured to transmit a data packet (e.g., a data symbol or PPDU) via a sub-1 GHz bandwidth channel of the network 140 and a receiver to receive the data packet. The packet 130 may conform to and comply with one or more standards, such as the IEEE 802.11ah standard. For example, the IEEE 802.11ah standard may include one or more inter-frame spacing parameters, as further described herein.

Inter-Frame Spacing (Timing) Parameters

Inter-frame spacing (e.g., a spacing value between two frames) parameters may include a clear channel assessment (CCA) time, a CCA mid time, an air propagation time, a slot time, and a short inter-frame space (SIFS) period. Exemplary values that may be used for the one or more parameters are provided in TABLE 1—Inter-frame Spacing Parameters. In TABLE 1, the exemplary values are in units of microseconds (μs).

TABLE 1

| Inter-frame Spacing Parameters | |
|---|---|
| CCA Time | 40 μs |
| CCA Mid Time | 25 μs |
| Air Propagation Time | 6 μs |
| Slot Time | 52 μs |
| SIFS | 16 μs |

Figure 2:
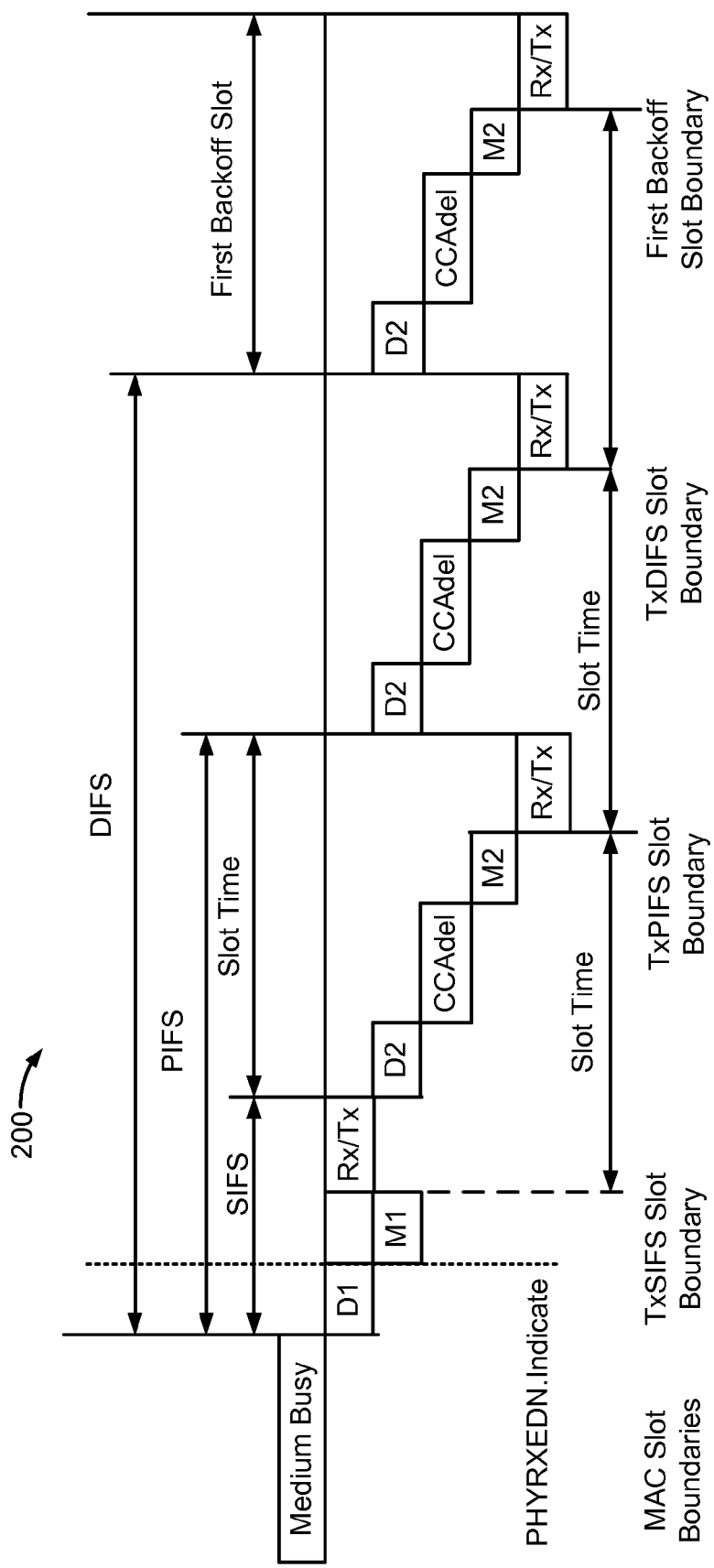
FIG. 2 is a timing diagram of associated with transmission of a frame based on one or more inter-frame spacing parameters associated with sub-1 GHz wireless networks.

The slot time and the SIFS time may be calculated based in part on exemplary timing intervals as shown in FIG. 2. Referring to FIG. 2, a timing diagram 200 associated with transmission of a frame (e.g., including a PPDU, a data symbol, the packet 130, or a combination thereof) based on one or more inter-frame spacing parameters associated with a network (e.g., the network 140 of FIG. 1) is shown. One or more aspects of the timing diagram 200 are based on one or more PHY parameters or constraints, such as the PHY parameters 112, 172 of FIG. 1. For example, FIG. 2 defines various timing periods associated with carrier sense multiple access (CSMA) communication. Based on the timing diagram 200, transmission of a frame (e.g., including a PPDU, a data symbol, or a combination thereof) of a transmitted packet is controlled based on timing parameters including a distributed coordination function (DCF) inter-frame spacing (DIFS) period and a first backoff slot period. The DIFS period includes a time duration during which the transmission station 106 determines that a medium is continuously idle before starting transmission of the frame. If the transmission station 106 determines that the medium is not continuously idle during the DIFS period, the transmission station 106 continues to monitor a busy or idle status of the medium. After determining that the medium is idle for a DIFS period, the transmission station 106 defers transmission of the frame for the first backoff slot period. The DIFS period includes a sum of a SIFS period and twice a slot time period. An access point (e.g., the transmitter station 106) may determine that the medium is continuously idle for a point coordination function (PCF) inter-frame spacing (PIFS) period, instead of the DIFS period, before transmitting the frame. The PIFS period includes a sum of the SIFS period and the slot time period. The PIFS period is shorter than the DIFS period, giving the access point greater priority to transmit than other devices.

The SIFS period includes a time duration between receiving a frame and sending an acknowledgement (ACK). For example, the receiver station 160 may receive the frame and wait for the SIFS period before sending an ACK. The SIFS period includes processing and turnaround delays. For example, the SIFS period includes a receive (Rx) radio frequency (RF) delay, a RX physical layer convergence procedure (PLCP) delay, a media access control (MAC) processing delay, and a Rx transmit (Tx) turnaround time. The Rx Tx turnaround time includes a Tx PLCP delay, a Rx Tx switch time, a Tx ramp-on time, and a Tx RF delay.

The slot time includes processing, turnaround, and air propagation time. For example, the slot time includes an air propagation time, the MAC processing delay, and the RxTx turnaround time. IEEE 802.11ah may specify a maximum distance between any two stations (i.e., the most distant allowable stations) that are slot synchronized. The air propagation time (indicated in microseconds in TABLE 1) is twice an amount of time (i.e., round trip propagation time) for a signal to cross a distance between the most distant allowable stations that are slot synchronized. The slot time also includes a clear channel assessment (CCA) time.

The CCA time includes a time duration (indicated in microseconds in TABLE 1) that a CCA mechanism of the transmitter station 106 has access to the medium within each time slot to determine whether the medium is busy or idle. In a particular embodiment, the CCA time may correspond to a time duration that the transmitter station 106 has access to a primary bandwidth channel within each time slot to determine whether the primary bandwidth channel is busy or idle. In this embodiment, the CCA mid time includes a time duration (indicated in microseconds in TABLE 1) that the CCA mechanism of the transmitter station 106 has access to the secondary bandwidth channel within each time slot to determine whether the secondary bandwidth channel is busy or idle.

In a particular embodiment, the transmitter station 106 may transmit a data symbol based on one or more inter-frame timing parameters, where the data symbol is transmitted via one or more bandwidth channels (e.g., a primary bandwidth channel or the primary bandwidth channel and a secondary bandwidth channel).

Inter-frame spacing (e.g., a spacing value between two frames) may be based on a parameter combination including a SIFS time of 160 microseconds, a slot time of 52 microseconds, a CCA time of 40 microseconds, a CCA mid time of 250, an air propagation time of 6 microseconds, or a combination thereof.

In a particular embodiment, the SIFS time, the slot time, or both, may be received by a station (e.g., the transmitter station 106, the receiver station 160), may be preset, may be determined by the station and stored in memory, or a combination thereof.

The SIFS time and the slot time may be calculated based on exemplary timing intervals as shown in FIG. 2. For example, the SIFS time may be a sum of D1, M1, and Rx/Tx of FIG. 2, where D1 represents a Rx RF delay, M1 represents a MAC processing delay, and Rx/Tx represents a Rx/Tx turnaround time. As another example, the slot time may be a sum of D2, CCAdel, M2, and Rx/Tx of FIG. 2, where D2 represents a sum of D1 and air propagation time, CCAdel represents a difference between a CCA time and D1, and M2 represents a MAC processing delay. Thus, the slot time may be a sum of the air propagation time, the CCA time, the MAC processing delay, and the Rx/Tx turnaround time. The Rx/Tx turnaround time may be a sum of a Tx PLCP delay, a Rx/Tx switch time, a Tx ramp on time, and a Tx RF delay.

The SIFS time and the slot time may be calculated based on one or more values and assumptions, such as one or more values and assumptions associated with an air propagation time, a Rx PLCP delay, a MAC Processing delay, a Tx PLCP delay, a Tx ramp on time, an Rx/Tx switch time, a Tx RF delay, an Rx RF delay, or a CCA time.

Exemplary values of inter-frame spacing parameter combinations are provided with reference to TABLES 2 and 3.

TABLE 2

| SIFS | |
|---|---|
| aRxRFDelay | 5 μs |
| aRxPLCPDelay | 125 μs |
| aMACProcessingDelay | 10 μs |
| aRxTxTurnaroundTime (aTxPLCPDelay + aRxTxSwitchTime + aTxRampOnTime + aTxRFDelay) | 15.5 (10 + 0.25 + 0.25 + 5) μs |
| SIFS | 156 μs |
| SIFS (multiple of 40 μs) | 160 μs |

TABLE 3

| SLOT TIME | |
|---|---|
| CCA Time | 40 μs |
| Air Propagation Time | 6 μs |
| aMACProcessingDelay | 0 μs |
| aRxTxTurnaroundTime (aTxPLCPDelay + aRxTxSwitchTime + aTxRampOnTime + aTxRFDelay) | 5.5 (0 + 0.25 + 0.25 + 5) μs |
| Slot Time | 52 μs |

In a particular embodiment, IEEE 802.11ah may specify a maximum distance of 900 meters between any two stations (i.e., the most distant allowable stations) that are slot synchronized. Assuming that a signal propagates at approximately 300 meters per microsecond, the air propagation time in this embodiment may be about 6 microseconds (i.e., 2*(900 meters/300 meters per microsecond)).

The Rx PLCP delay (aRxPLCPDelay), the MAC processing delay (aMACProcessingDelay), and the Tx PLCP delay (aTxPLCPDelay) include digital processing delays that may depend on a first digital clock rate associated with a baseband processor (e.g., an IEEE 802.11ah baseband processor, such as the baseband processor 116 of FIG. 1 or the baseband processor 176 of FIG. 1). The Rx PLCP delay is a time duration that a PLCP module (e.g., the PLCP module 194) may take to deliver a last bit of a received frame from a receive path to a MAC module (e.g., the MAC module 192). The Tx PLCP delay is a time duration that a PLCP module (e.g., the PLCP module 154) may take to deliver a symbol from a MAC module (e.g., the MAC module 152) to a transmit data path. The MAC processing delay may represent a processing delay of a MAC module. For example, the MAC processing delay is a maximum duration that a MAC module (e.g., the MAC module 152, the MAC module 192, or both) may take to process communications to and from the PLCP module (e.g., the PLCP module 154, the PLCP module 194, or both).

The first digital clock rate (e.g., as specified by the IEEE 802.11ah standard) may be equivalent to a second digital clock rate (e.g., associated with an IEEE 802.11n/ac baseband processor) downclocked by a particular factor (e.g., 10). The digital processing delays (e.g., the aRxPLCPDelay, aMACProcessingDelay, and aTxPLCPDelay values) associated with the first digital clock rate may be determined by multiplying the digital processing delays associated with the second digital clock rate by the downclocking factor (i.e., 10). In a particular embodiment, aRxPLCPDelay associated with the second digital clock rate may be 12.5 microseconds and aMACProcessingDelay and aTxPLCPDelay associated with the second digital clock rate may be 1 microsecond each. In this embodiment, the aRxPLCPDelay associated with the first digital clock rate may be 125 microseconds (i.e., 12.5× 10) and aMACProcessingDelay and aTxPLCPDelay associated with the first digital clock rate may be 10 microseconds (i.e., 1×10) each.

TABLE 3 includes exemplary values that may be used to determine the slot time. The slot time may be determined based on aMACProcessingDelay of zero, because the MAC calculation may be done by the transmitter station 106 prior to (e.g., before) a transmission. The slot time may be determined based on aTxPLCPDelay of zero.

The Tx ramp on time (aTxRampOnTime) and the Rx Tx switch time (aRxTxSwitchTime) may be assumed to be the same as specified by IEEE 802.11n/ac. The Tx RF delay (aTxRFDelay) and the Rx RF delay (aRxRFDelay), assuming a same filter order as specified by IEEE 802.11n/ac, may increase due to bandwidth scaling (e.g., 10× based on 2 MHz IEEE 802.11ah bandwidth vs. 20 MHz IEEE 802.11n/ac bandwidth) as compared to IEEE 802.11n/ac. Furthermore, a station operating in the 1 MHz mode may use the same filter (e.g., the filter(s) 102 or the filter(s) 162) as when operating in the 2 MHz mode. If a narrower filter is used in the 1 MHz mode, a longer filter delay associated with using the narrower filter may be compensated by a smaller digital delay of the 1 MHz mode.

The CCA time and the CCA mid time may depend on the first digital clock rate associated with the baseband processor (e.g., the IEEE 802.11ah baseband processor). Based on a downclocking factor of 10, the CCA time and the CCA mid time specified by IEEE 802.11n/ac may be multiplied by 10. For example, the CCA time may be 40 microseconds (i.e., 4×10) and the CCA mid time may be 250 microseconds (i.e., 25×10). The CCA time of 40 microseconds may be long enough to achieve a greater than 90% detection rate of a presence of a signal that occupies the primary bandwidth channel. The CCA mid time of 250 microseconds may be long enough to achieve a greater than 90% detection rate of a presence of a signal that occupies the secondary bandwidth channel.

As illustrated in TABLE 2, the SIFS time may be a multiple of symbol time (e.g., 40 microseconds) that is close to the exemplary SIFS time calculated based on the downclocking factor. For example, the SIFS time may be 160 microseconds instead of the SIFS time of 156 microseconds.

The system 100 may thus include a transmitter configured to transmit a data packet (e.g., a data symbol or PPDU) via a sub-1 GHz bandwidth channel of the network 140 and a receiver to receive the data packet. The packet may conform to and comply with one or more standards, such as the IEEE 802.11ah standard. For example, the IEEE 802.11ah standard may specify one or more inter-frame spacing parameters, as further described herein.

Wireless local area networks (WLANs) compliant with the IEEE 802.11ac standard may operate in high frequency bands (e.g., 5 GHz) and may provide data rates ranging to more than 1 gigabit per second (Gbps). However, the range of operation of WLANs compliant with the IEEE 802.11 ac standard may be relatively short due to high frequency of operation. The range of operation may be extended by lowering operating frequencies. However, lower operating frequencies may result in lower data rates. For example, WLANs compliant with the IEEE 802.11ah standard may operate in a sub-1 GHz frequency band and may have a longer range of operation but may also have lower data rates than the WLANs compliant with the IEEE 802.11ac standard. A slower clock rate may support a longer range of operation and may also support communication using narrower bandwidth channels. For example, a first clock rate associated with the IEEE 802.11ah standard may be slower than a second clock rate associated with the IEEE 802.11ac standard. The slower clock rate associated with the IEEE 802.11ah standard may support the longer range of operation of WLANs compliant with the IEEE 802.11ah standard as compared to WLANs compliant with the IEEE 802.11ac standard. The slower clock rate may also support communication using narrower bandwidth channels in the WLANs compliant with the 802.11ah standard as compared to the WLANs compliant with the 802.11ac standard.

Figure 3:
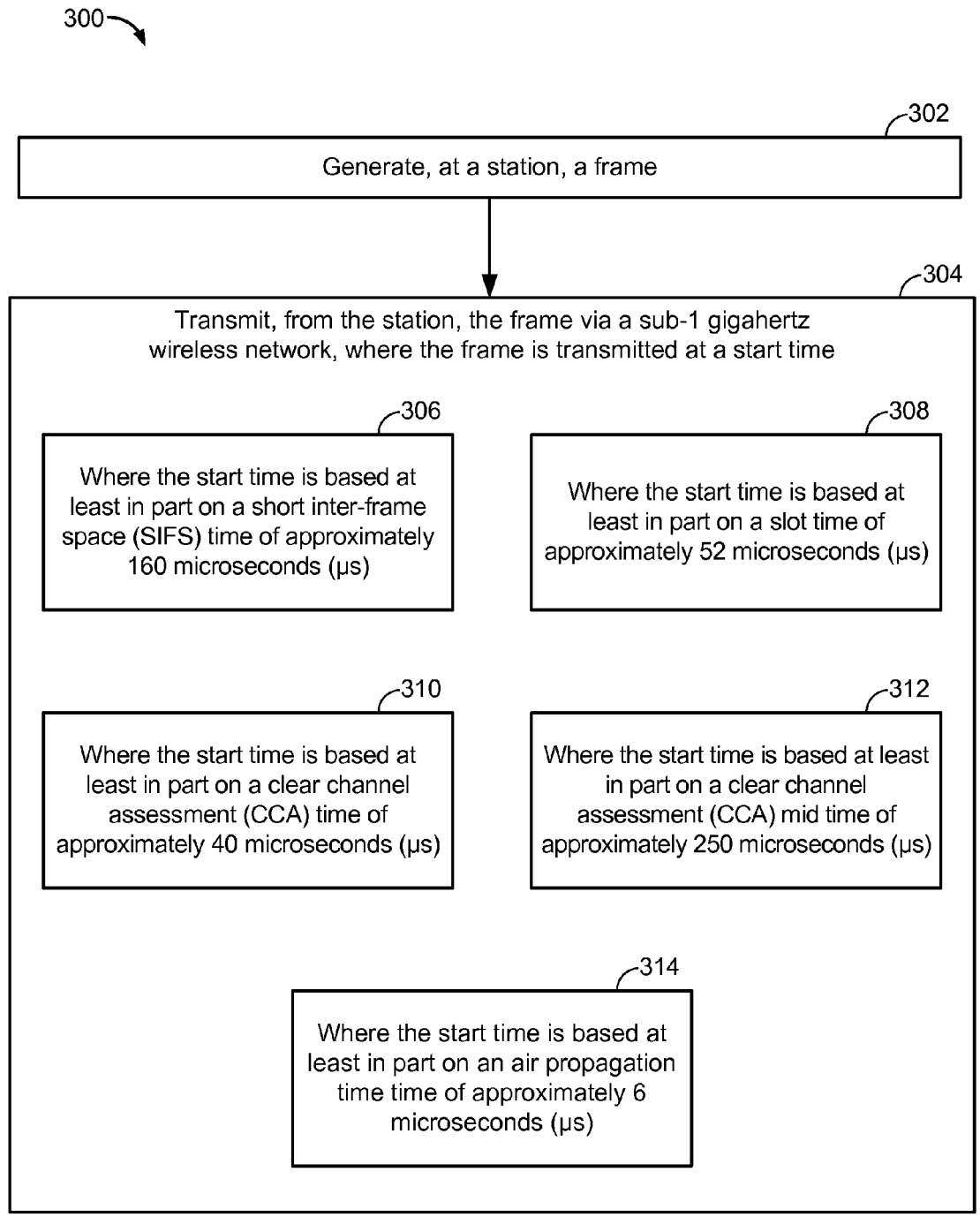
FIG. 3 is a flow diagram illustrating a particular method of transmitting a frame via a sub-1 GHz wireless network, the transmission based on one or more inter-frame spacing parameters.

Referring to FIG. 3, a particular illustrative embodiment of a method of transmitting a frame via a sub-1 gigahertz wireless network is shown. For example, the frame may include the packet 130 of FIG. 1.

The method 300 may include generating a frame at a station, at 302. For example, the station may include the transmitter station 106 of FIG. 1 and the frame may include the packet 130 of FIG. 1. To illustrate, the transmitter station 106 may transmit the packet 130 via the network 140, where the packet 130 is transmitted at a start time that is determined based on the PHY parameters 112.

The method 300 may also include transmitting, from the station, the frame via a sub-1 GHz wireless network, at 304. The frame may be transmitted at a start time.

For example, at 306, the start time may be based at least in part on a short inter-frame space (SIFS) time of approximately 160 microseconds.

As another example, at 308, the start time may be based at least in part on a slot time of approximately 52 microseconds.

As another example, at 310, the start time may be based at least in part on a clear channel assessment (CCA) time of approximately 40 microseconds.

As another example, at 312, the start time may be based at least in part on a CCA mid time of approximately 250 microseconds.

As another example, at 314, the start time may be based at least in part on an air propagation time of approximately 6 microseconds.

In a particular embodiment, the method 300 may include one or more of 306-314. For example, the start time may be based at least in part on the SIFS time of approximately 160 microseconds, at 306, the slot time of approximately 52 microseconds, at 308, the CCA time of approximately 40 microseconds, at 310, the CCA mid time of approximately 250 microseconds, at 312, the air propagation time of approximately 6 microseconds, at 314, or a combination thereof.

Figure 4:
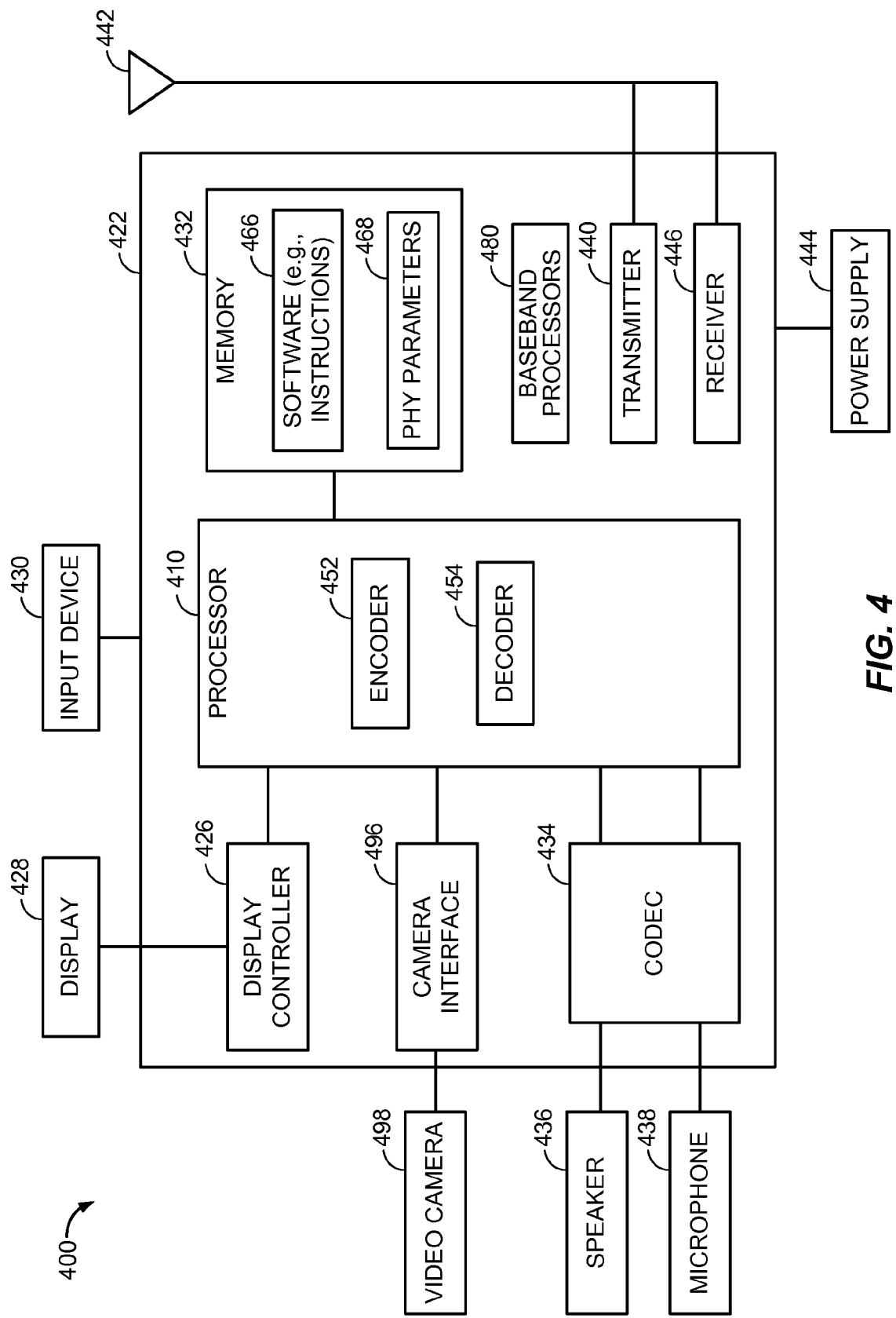
FIG. 4 is a block diagram of a particular embodiment of a device that is configured to communicate data over a sub-1 GHz wireless network.

FIG. 4 is a block diagram of a particular embodiment of a device 400 (e.g., a communication device) configured to transmit or receive data using a sub-1 GHz network. The device 400 may be a wireless electronic device and may include a processor 410, such as a digital signal processor (DSP), coupled to a memory 432. For example, the device 400 may include the transmitter station 106 of FIG. 1, the receiver station 160 of FIG. 1, or both. The memory 432 may include the memory 110 of FIG. 1, the memory 170 of FIG. 1, or both.

The processor 410 may be configured to execute software 466 (e.g., a program of one or more instructions) stored in the memory 432. For example, the processor 410 may include the processor 108 of FIG. 1, the processor 168 of FIG. 1, or both. In a particular embodiment, the processor 410 may be configured to operate in accordance with at least a portion of the method 300 of FIG. 3. The memory 432 may also include PHY parameters 468. For example, the PHY parameters 468 may include the PHY parameters 112 of FIG. 1, the PHY parameters 172 of FIG. 1, or both. The PHY parameters 468 may include one or more parameter values illustrated in TABLES 1-3. One or more of PHY parameters 468 may be used by the device 400 in conjunction with transmission or reception of one or more data packets (e.g., one or more data symbols).

In a particular embodiment, the processor 410 may be configured to execute computer executable instructions (e.g., the software 466) stored at a non-transitory computer-readable medium, such as the memory 432. The instructions are executable to cause a computer, such as the processor 410, to perform at least a portion of the method 300 of FIG. 3. For example, the computer executable instructions may be executable to cause the processor generate or process a data packet (e.g., a PPDU, a data symbol, a frame, or the packet 130 of FIG. 1). The computer executable instructions (e.g., the software 466) are further executable to cause the processor 410 to initiate transmission of or to receive the data packet via a sub-1 GHz bandwidth channel (e.g., of the network 140 of FIG. 1).

The processor 410 may include an encoder 452 and a decoder 454. For example, the encoder 452 and the decoder 454 may include the packet creation encoding module 114 and the packet decoding module 174 of FIG. 1, respectively. Although the encoder 452 and the decoder 454 are illustrated in FIG. 4 as being included in the processor 410, the encoder 452, the decoder 454, or a combination thereof, may be included in or coupled to one or more other components, such as one or more baseband processors 480, of the device 400.

In a particular embodiment, the baseband processors 480 may include a first baseband processor that is configured to operate in compliance with the IEEE 802.11ah standard. For example, the baseband processors 480 may include the baseband processor 116 of FIG. 1, the baseband processor 176 of FIG. 1, or both. In a particular embodiment, the baseband processors 480 may include a second baseband processor that is configured to operate in compliance with another standard (e.g., the IEEE 802.11n/ac standard). One or more inter-frame spacing parameters may be determined based at least in part on digital processing delays (e.g., an Rx PLCP delay, a MAC processing delay, a Tx PLCP delay, or a combination thereof). The digital processing delays may be based on a clock rate. In a particular embodiment, a first clock rate associated with the first baseband processor may be equivalent to a second clock rate associated with the second baseband processor downclocked by a particular factor (e.g., 10). In this embodiment, a first digital processing delay (e.g., an Rx PLCP delay) associated with the IEEE 802.11ah standard may be determined by multiplying a second digital processing delay (e.g., an Rx PLCP delay of 12.5 microseconds) associated with the IEEE 802.11n/ac standard by the downclocking factor (i.e., 10). The baseband processors 480 may be included in or coupled to one or more components of the device 400, such as the processor 410, the encoder 452, the decoder 454, a transmitter 440, a receiver 446, or a coder/decoder (CODEC) 434.

A camera interface 496 may be coupled to the processor 410 and may also be coupled to a camera, such as a video camera 498. A display controller 426 may be coupled to the processor 410 and to a display device 428. The CODEC 434 may also be coupled to the processor 410. A speaker 436 and a microphone 438 may be coupled to the CODEC 434. The device 400 may also include or be coupled to a power supply 444 configured to provide power to one or more components included in or coupled to the device 400.

The transmitter 440 may be coupled to one or more wireless antennas 442. For example, the wireless antennas 442 may include the wireless antennas 120 of FIG. 1, the wireless antennas 180 of FIG. 1, or both. The transmitter 440 may include the transmitter 118 of FIG. 1. The receiver 446 may also be coupled to the wireless antennas 442. For example, the receiver 446 may include the receiver 178 of FIG. 1.

In a particular embodiment, the processor 410, the display controller 426, the memory 432, the CODEC 434, the baseband processors 480, the camera interface 496, the receiver 446, the transmitter 440, or a combination thereof are included in a system-in-package or system-on-chip device 422. In a particular embodiment, an input device 430 and the power supply 444 are coupled to the system-on-chip device 422. Moreover, in a particular embodiment, as illustrated in FIG. 4, the display device 428, the input device 430, the speaker 436, the microphone 438, the wireless antennas 442, video camera 498, and the power supply 444 are external to the system-on-chip device 422. In a particular embodiment, one or more of the display device 428, the input device 430, the speaker 436, the microphone 438, the wireless antenna 442, the video camera 498, and the power supply 444 may be coupled to a component of the system-on-chip device 422, such as an interface or a controller.

In conjunction with one or more of the described embodiments, an apparatus is disclosed that includes means for generating a frame. The means for generating the frame may include the processor 108, the packet creation/encoding module 114, the baseband processor 116 of FIG. 1, the processor 410, the encoder 452, the baseband processors 480 of FIG. 4, one or more other devices or circuits configured to generate a frame, or any combination thereof.

The apparatus may also include means for transmitting the frame via a sub-1 GHz wireless network at a start time based at least in part on a short inter-frame spacing (SIFS) time of 160 microseconds. The means for transmitting the frame may include the baseband processor 116, the transmitter 118, the wireless antenna 120 of FIG. 1, the baseband processors 480, the transmitter 440, the wireless antenna 442 of FIG. 4, one or more other devices or circuits configured to transmit a frame via the sub-1 GHz wireless network, or any combination thereof.

One or more of the disclosed embodiments may be implemented in a system or an apparatus, such as the device 400, that may include a communications device, a fixed location data unit, a mobile location data unit, a mobile phone, a cellular phone, a satellite phone, a computer, a tablet, a portable computer, or a desktop computer. Additionally, the device 400 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-4 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including a processor and a memory.

Those of skill would further appreciate that the various illustrative logical blocks, configurations, modules, circuits, and algorithm steps described in connection with the embodiments disclosed herein may be implemented as electronic hardware, computer software executed by a processor, or a combination thereof. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions are not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A device comprising a transmitter and a memory, wherein the transmitter is configured to transmit a frame, via a sub-1 gigahertz (GHz) wireless network, at a start time based at least in part on a slot time of 52 microseconds.

2. The device of claim 1, wherein the start time is further based at least in part on an air propagation time of 6 microseconds.

3. The device of claim 1, wherein the start time is further based at least in part on a short inter frame spacing (SIFS) time of 160 microseconds.

4. The device of claim 1, wherein the transmitter is compliant with an institute of electrical and electronics engineers (IEEE) 802.11 ah standard.

5. The device of claim 1, wherein the start time is further based at least in part on a clear channel assessment (CCA) time.

6. The device of claim 5, wherein the CCA time is less than 40 microseconds.

7. The device of claim 1, wherein the transmitter includes a media access control (MAC) component, and wherein the slot time is at least partially based on a delay of the MAC component.

8. A non-transitory computer-readable storage device storing instructions that, when executed by a processor, cause the processor to initiate transmission, via a sub-1 gigahertz (GHz) wireless network, of a frame at a start time based on a slot time of 52 microseconds.

9. The non-transitory computer-readable storage device of claim 8, wherein the start time is further based at least in part on an air propagation time of 6 microseconds.

10. A non-transitory computer-readable storage device storing instructions that, when executed by a processor, cause the processor to initiate transmission, via a sub-1 gigahertz (GHz) wireless network, of a frame at a start time based on a slot time of 52 microseconds and a short inter-frame spacing (SIFS) time of 160 microseconds.

11. The non-transitory computer-readable storage device of claim 10, wherein the start time is further based on a clear channel assessment (CCA) time of approximately 40 microseconds.

12. The non-transitory computer-readable storage device of claim 10, wherein the start time is further based on an air propagation time of 6 microseconds.

13. The non-transitory computer-readable storage device of claim 10, wherein the start time is further based on an air propagation time of 6 microseconds and on a clear channel assessment (CCA) time of approximately 40 microseconds.

14. A method comprising transmitting, from a station, a frame via a sub-1 gigahertz (GHz) wireless network, wherein the frame is transmitted at a start time based at least in part on a clear channel assessment (CCA) time of less than 40 microseconds and a slot time of 52 microseconds.

15. The method of claim 14, wherein the start time is further based at least in part on an air propagation time of 6 microseconds.

16. The method of claim 14, wherein the start time is further based at least in part on a short inter-frame spacing (SIFS) time of 160 microseconds.

17. The method of claim 14, wherein the start time is further based at least in part on a short inter-frame spacing (SIFS) time of 160 microseconds and on an air propagation time of 6 microseconds.

18. An apparatus comprising:
means for generating a frame; and
means for transmitting the frame, via a sub-1 gigahertz (GHz) wireless network, at a start time based at least in part on a slot time of 52 microseconds, and a short inter-frame spacing (SIFS) time of 160 microseconds or a clear channel assessment (CCA) time of less than 40 microseconds.

19. The apparatus of claim 18, wherein the means for generating the frame includes a processor.

* * * * *